United States Patent
Cuffney et al.

(10) Patent No.: US 9,734,126 B1
(45) Date of Patent: Aug. 15, 2017

(54) POST-SILICON CONFIGURABLE INSTRUCTION BEHAVIOR BASED ON INPUT OPERANDS

(71) Applicant: International Business Machines Corporation, Armonk, NY (US)

(72) Inventors: James R. Cuffney, Poughkeepsie, NY (US); Nicol Hofmann, Boeblingen (DE); Michael Klein, Boeblingen (DE); Petra Leber, Boeblingen (DE); Cédric Lichtenau, Boeblingen (DE); Silvia M. Mueller, Boeblingen (DE); Timothy J. Slegel, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/289,388

(22) Filed: Oct. 10, 2016

(51) Int. Cl.
*G06F 15/78* (2006.01)
*G06F 11/36* (2006.01)
*G06F 7/57* (2006.01)

(52) U.S. Cl.
CPC .......... *G06F 15/7867* (2013.01); *G06F 7/57* (2013.01); *G06F 11/3644* (2013.01); *G06F 11/3648* (2013.01)

(58) Field of Classification Search
CPC ..... G06F 11/3644; G06F 11/3648; G06F 7/57
USPC ........................................................ 712/226
See application file for complete search history.

(56) References Cited

U.S. PATENT DOCUMENTS

| | | | |
|---|---|---|---|
| 7,610,475 B2 | 10/2009 | Arnold et al. | |
| 8,006,204 B2 | 8/2011 | Killian et al. | |
| 8,966,223 B2 | 2/2015 | Knowles | |
| 9,348,795 B1 | 5/2016 | Langhammer | |
| 9,389,955 B1* | 7/2016 | Cuffney | G06F 11/079 |
| 9,417,839 B1* | 8/2016 | Powell | G06F 5/012 |
| 2006/0117082 A1* | 6/2006 | Lutz | G06F 7/487 708/625 |
| 2007/0203965 A1* | 8/2007 | Reynolds | G06F 17/215 708/200 |
| 2011/0246747 A1* | 10/2011 | Hanai | G06F 9/3897 712/29 |
| 2012/0011181 A1* | 1/2012 | Samy | G06F 7/483 708/204 |
| 2013/0212139 A1* | 8/2013 | Gschwind | G06F 7/483 708/204 |
| 2013/0227375 A1* | 8/2013 | Kaltenback | H03M 13/05 714/776 |
| 2014/0351308 A1* | 11/2014 | Tannenbaum | G06F 7/483 708/501 |

(Continued)

*Primary Examiner* — Andrew Caldwell
*Assistant Examiner* — Michael Metzger
(74) *Attorney, Agent, or Firm* — Cantor Colburn LLP; Steven Chu

(57) ABSTRACT

A system and method for controlling post-silicon configurable instruction behavior are provided. For example, the method includes receiving data related to a compute circuit. The method also includes detecting a data pattern in the data. The method further includes determining that the data pattern is a special case that the compute circuit may handle improperly. The method also includes selecting a value from a post-silicon configurable data set based on the detected data. Further, the method includes changing a behavior of the compute circuit to produce a different output result based on the value selected from the post-silicon configurable data set.

17 Claims, 8 Drawing Sheets

(56) References Cited

U.S. PATENT DOCUMENTS

2015/0067389 A1  3/2015  Galloway

* cited by examiner

POST-SILICON CONFIGURABLE INSTRUCTION BEHAVIOR BASED ON INPUT OPERANDS

BACKGROUND

The subject matter disclosed herein generally relates to controlling a compute circuit and, more particularly, to controlling post-silicon configurable instruction behavior of a compute circuit.

Currently, core logic development can be completed many months to years in advance of a product launch. For example, currently, some timelines have core logic development complete about three years before the logic is returned in silicon and shipped as a product to a customer making it generally available.

This means that decisions are taken very early for the project on the exact implementation of instructions, even before the software teams designing products to run on the core logic have refined and finalized their requirement for a new instruction. In the past, this has led to adding new instructions in hardware that turned out to not be used by software because they did not fulfil all requirements. Accordingly, a lot of development effort and silicon area is potentially wasted. Also, the new instructions may need to be supported for all next generations of chip, increasing the burden and potential waste. Thus, the elongated development time can make it difficult to react to changes e.g. in open source software, when a new technology emerges and a similar instruction is implemented by another and the software tailored for that new instruction.

Currently, in order to take advantage of the most recent instructions, a new machine would be needed to have a competitive implementation that can handle the new instruction technology. However, a new release of a chip can take years and even if the timelines are accelerated, metal layer changes are expensive and the management of existing versions of the chip are challenging.

Alternatively, software can be coded to work around the existing limitation of the hardware instruction, resulting in slower code and overall lower system efficiency and speed. Further, software rewrites can also be cost intensive and are slow to react to changes in open source software. Further, a field-programmable gate array (FPGA) implementation can be used but these devices have limited bandwidth (are "far" from the processor cores) and have a large implementation bill.

Accordingly, there is a desire to provide a system and/or method to handle the special cases in instruction coding that evolve over time by the time a circuit is brought to market.

SUMMARY

According to one embodiment a method for controlling post-silicon configurable instruction behavior is provided. The method includes receiving data related to a compute circuit. The method also includes detecting a data pattern in the data. The method further includes determining that the data pattern is a special case that the compute circuit may handle improperly. The method also includes selecting a value from a post-silicon configurable data set based on the detected data. Further, the method includes changing a behavior of the compute circuit to produce a different output result based on the value selected from the post-silicon configurable data set.

In addition to one or more of the features described above, or as an alternative, further embodiments may include wherein the data includes one or more of input operands, integers, characters, character strings, and integer strings. In addition to one or more of the features described above, or as an alternative, further embodiments may include wherein the data is input data received by the compute circuit. In addition to one or more of the features described above, or as an alternative, further embodiments may include wherein the data is produced by the compute circuit as an intermediary value. In addition to one or more of the features described above, or as an alternative, further embodiments may include wherein the data is produced by the compute circuit as an output result.

In addition to one or more of the features described above, or as an alternative, further embodiments may include wherein the compute circuit is at least one selected from a group consisting of an instruction circuit, an adder, a subtractor, a multiplier, a divider, a logic gate, an arithmetic logic unit (ALU), a floating-point unit (FPU), a central processing unit (CPU), and a graphics processing unit (GPU).

In addition to one or more of the features described above, or as an alternative, further embodiments may include wherein the data pattern is one or more of a positive zero value, a negative zero value, a not-a-number (NaN) value, negative infinity, and positive infinity. In addition to one or more of the features described above, or as an alternative, further embodiments may include wherein the special case is defined as a processing change that has occurred since creation of the compute circuit.

In addition to one or more of the features described above, or as an alternative, further embodiments may include wherein the special case is one or more of detection of a zero value, detection of a NaN value, detection of defined integer value, detection of a particular character. In addition to one or more of the features described above, or as an alternative, further embodiments may include wherein the post-silicon configurable data set is stored in a configuration register. In addition to one or more of the features described above, or as an alternative, further embodiments may include wherein the post-silicon configurable data set is stored in one or more memory devices.

In addition to one or more of the features described above, or as an alternative, further embodiments may include wherein the value is one or more selected from a group consisting of an operand, an integer, a character, a character string, and an integer string. In addition to one or more of the features described above, or as an alternative, further embodiments may include wherein the value is configured to provide a correct output result in accordance with an up to date processing scheme in operation. In addition to one or more of the features described above, or as an alternative, further embodiments may include wherein the value corresponds to the detected data pattern, and wherein the value is an expected result when the detected data pattern is present.

In addition to one or more of the features described above, or as an alternative, further embodiments may include wherein changing the behavior of the compute circuit includes at least one from a group consisting of bypassing the compute circuit, using a sub-portion of internal logic of the compute circuit, providing different inputs to the compute circuit, and changing the output of the compute circuit.

According to an embodiment, a system for controlling post-silicon configurable instruction behavior is provided. The system includes a memory having computer readable instructions, and a processor that includes a compute circuit, a pattern detector, and a steering controller. The processor is configured to execute the computer readable instructions, the computer readable instructions include receiving, at the pattern detector, data related to the compute circuit, detecting, using the pattern detector, a data pattern in the data, determining, using at least one of a steering controller and a pattern detector, that the data pattern is a special case that the compute circuit may handle improperly, selecting, from a configuration register, a value from a post-silicon configurable data set, wherein selection is based on the detected data, and changing, using the steering controller, a behavior of the compute circuit to produce a different output result based on the value selected from the post-silicon configurable data set.

In addition to one or more of the features described above, or as an alternative, further embodiments may include wherein changing the behavior of the compute circuit further includes an operand modifier that is configured to change a data input to the compute circuit by change an input operand of the data based on the data pattern and value selected, wherein the operand modifier is controlled by the steering controller.

In addition to one or more of the features described above, or as an alternative, further embodiments may include wherein changing the behavior of the compute circuit further includes a result corrector that is configured to change the output result from the compute circuit based on the data pattern and value selected, wherein the result corrector is controlled by the steering controller.

In addition to one or more of the features described above, or as an alternative, further embodiments may include wherein the steering controller includes a multiplexer that selects the value from the configuration register based on inputs from the pattern detector. Also, the compute circuit includes a plurality of multiplexers that are configured to bypass logic circuitry in the compute circuit based on the value received from the multiplexer of the steering controller.

According to an embodiment, a computer program product for controlling post-silicon configurable instruction behavior is provided. The computer program product including a computer readable storage medium having program instructions embodied therewith. The program instructions executable by a processor to cause the processor to receive data related to a compute circuit, detect a data pattern in the data, determine that the data pattern is a special case that the compute circuit may handle improperly, select a value from a post-silicon configurable data set based on the detected data, and change a behavior of the compute circuit to produce a different output result based on the value selected from the post-silicon configurable data set.

The foregoing features and elements may be combined in various combinations without exclusivity unless expressly indicated otherwise. These features and elements, as well as the operation thereof, will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
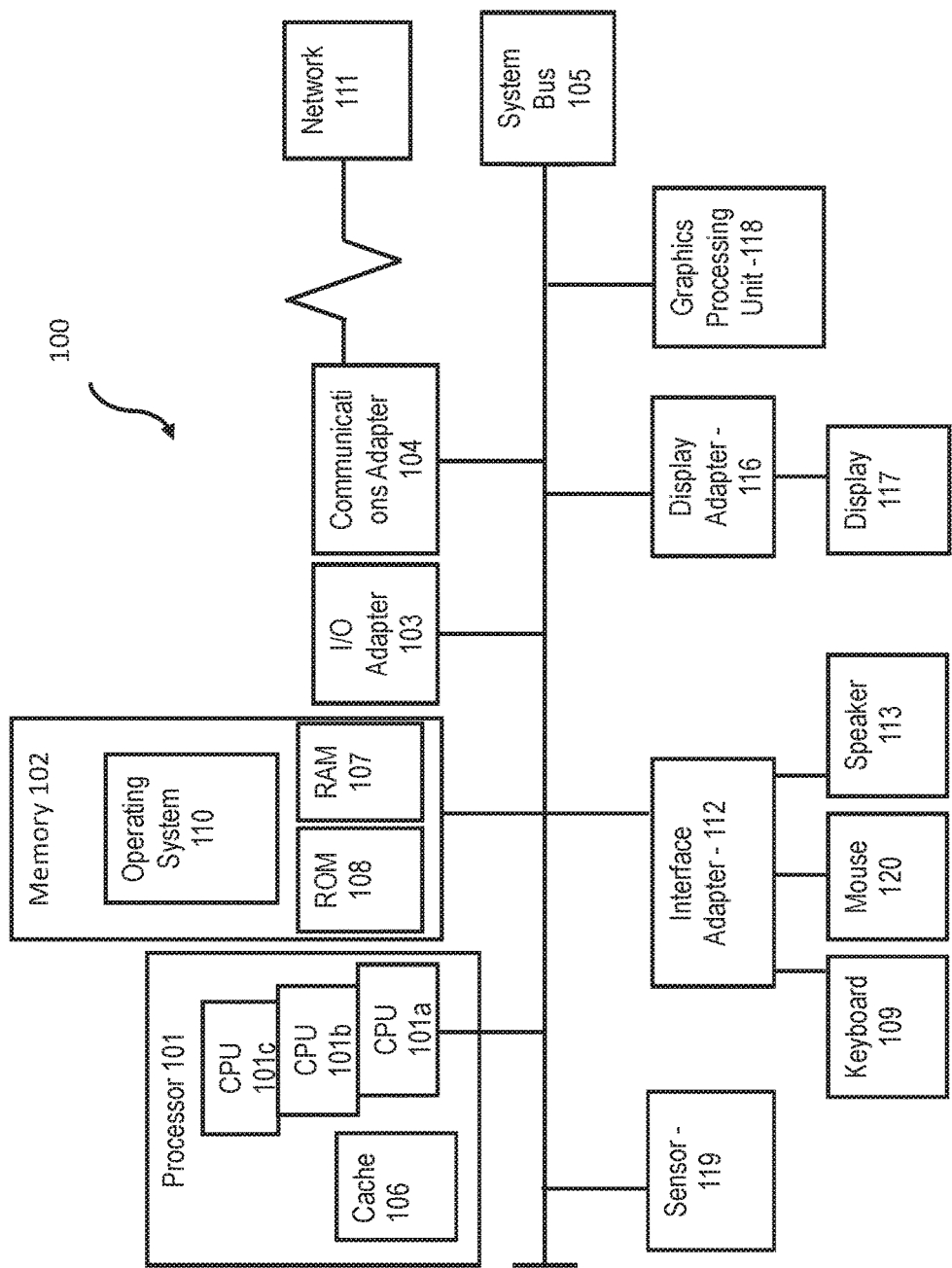
FIG. 1 illustrates a block diagram of a computer system for use in practicing the embodiments described herein.

A detailed description of one or more embodiments of the disclosed apparatus and method are presented herein by way of exemplification and not limitation with reference to the Figures.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

As discussed above, the architecture of a chip can be defined years before general availability (GA) and code is written to take advantage of the enhancements. However, while trends will mostly still hold three years later, the detailed requirements can change during the years of development. Additionally, during that time new languages with different requirements arise that the chip architecture was not designed to support.

It can be appreciated that being able to support only a subset of languages is inefficient especially in a dynamic environment were change is prevalent. In order to bridge the gap, currently a few different approaches include using software, millicode, and/or firmware code to fulfill the missing functionality. These fixes can be costly and time consuming to create and are slow, resulting in significant performance lost. Further, these fixes can only provide missing functionality. A newly added instruction on the chip can become useless in its current form making the hardware added dead silicon costing area and power. Further, this dead instruction is normally built in the next generation of the machines compounding the power and area cost.

This can result in only a partial performance gain compared to the original expectation and/or very late and tedious hardware fixes. Thus, currently, the design and building process of chips is not flexible to support future language generation in the current timeframes that exist for the process.

Accordingly, embodiments described herein are directed to adding configurable hardware to a processor arithmetic unit to allow changes/adoptions for the execution of special arithmetic operations. For example, in the case of changing standards (e.g., programming languages), the execution of arithmetic operations can be corrected after the release of hardware (post-silicon). According to one or more embodiments, this can be done with a special re-programmable configuration register (programmable after the chip is manufactured) that contains configurations for the steering of a control block dependent on an input pattern. In another example, according to one or more embodiments, the result of an instruction (e.g., compare) can be configured and modified based on the input operands type or value. This can be done without hardware modification and does not slow down instruction execution which can provide a number of advantages over existing methods and systems.

Turning now to FIG. 1, an electronic computing device 100, which may also be called a computer system 100, that includes a plurality of electronic computing device sub-components is generally shown in accordance with one or more embodiments. Particularly, FIG. 1 illustrates a block diagram of a computer system 100 (hereafter "computer 100") for use in practicing the embodiments described herein.

The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Communications adaptor 104 may be operatively connect computer 100 to one or more networks 111. System bus 105 may also connect one or more user interfaces via interface adaptor 112. Interface adaptor 112 may connect a plurality of user interfaces to computer 100 including, for example, keyboard 109, mouse 120, speaker 113, etc. System bus 105 may also connect display adaptor 116 and display 117 to processor 101. Processor 101 may also be operatively connected to graphical processing unit 118.

Further, the computer 100 may also include a sensor 119 that is operatively connected to one or more of the other electronic sub-components of the computer 100 through the system bus 105. The sensor 119 can be an integrated or a standalone sensor that is separate from the computer 100 and may be communicatively connected using a wire or may communicate with the computer 100 using wireless transmissions.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 110. Operating system 110 can control the execution of other computer programs and provides scheduling, input-output control, file and data management, memory management, and communication control and related services.

Input/output adaptor 103 can be, for example, but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 120. Other output devices, e.g., speaker 113, may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 111.

Network 111 can be an IP-based network for communication between computer 100 and any external device. Network 111 transmits and receives data between computer 100 and external systems. In an exemplary embodiment, network 111 can be a managed IP network administered by a service provider. Network 111 may be implemented in a wireless fashion, e.g., using wireless protocols and technologies, such as WiFi, WiMax, etc. Network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 110, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

According to one or more embodiments, any one of the electronic computing device sub-components of the computer 100 includes a circuit board connecting circuit elements that can process data in accordance with one or more embodiments using a compute circuit and the system and/or method as described herein.

According to one or more embodiments, a method and/or apparatus is provided in a compute circuit to detect a particular pattern involving data received or produced by the compute circuit. Based on this particular pattern, post-silicon configurable register content can be selected that can change the behavior of the compute circuit to produce a different result that is in line with current coding and instructions requirements. The data can be input operands, intermediate results inside the compute circuit, the computed result from the compute circuit, or a combination thereof.

According to one or more embodiments, the modified result can be reached by using a steering controller in the existing unit logic or by adding a supplementary block between the input operands of the compute circuit or between the result produced by the compute circuit and the external connections of the compute circuit. According to another embodiment, a memory element can also be used instead of the configurable register.

One or more embodiments are able to detect special cases based on the input operands and steer the computation based on a small programmable configuration register to produce different results for these cases. This can be done, for example, by detecting an input operand, determining a type and/or value of the input operand, and based on the detected type/value, determining if the input operand is one of the special cases that has changed over time and is no longer supported correctly by the chip. If it is, the configuration register is used to provide a corresponding value that, when used, provides a correct output result in accordance with current instruction requirements. Particularly, the data pulled from the configuration register changes how the instruction is executed for these special cases. For example, the steering controller will use the value retrieved from the configuration register to override the compute circuit, select a specific output, or provide alternative input values that use the compute circuit hardware to generate the output.

Particularly, in accordance with one or more embodiments, a system and method can detect special arithmetic numbers (e.g. zero, infinity, NaN, . . . ) on the input operands and steer the computation done by the compute circuit based on a small programmable configuration register to produce different results for these special cases. Further, according to one or more embodiments, the steering includes but is not limited to adding/subtracting one to the result, exchanging operands, or inverting the result.

Figure 2:
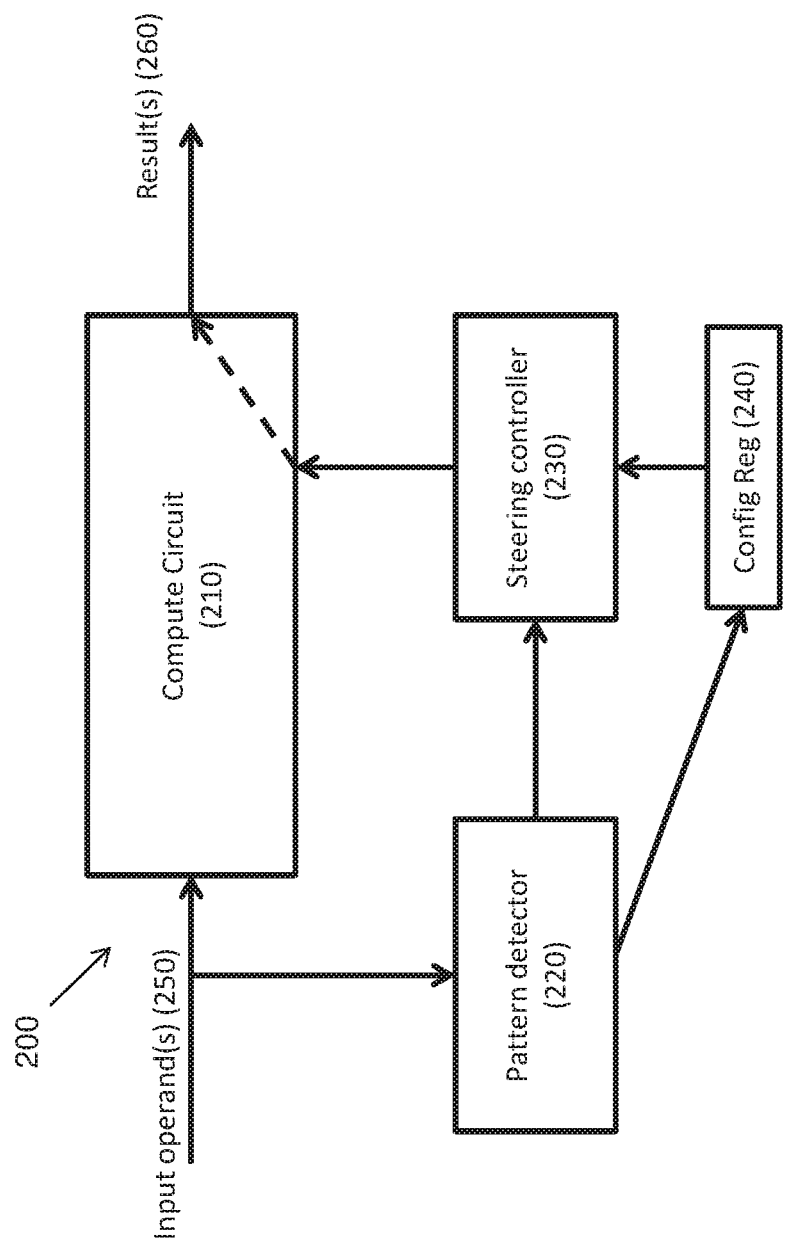
FIG. 2 is a block diagram of a system for controlling post-silicon configurable instruction behavior in accordance with one or more embodiments.

Turning now to FIG. 2, a block diagram is shown of a system 200 for controlling post-silicon configurable instruction behavior in accordance with one or more embodiments. The system 200 includes a compute circuit 210, a pattern detector 220, a steering controller 230, and a configuration register 240. As shown, an input of data, particularly input operands 250, are received by the system 200. The input operands 250 are received by both the compute circuit 210 and the pattern detector 220. The compute circuit takes the input operands 250 and may begin computing normally or can wait until it receives further instructions from the steering controller 230 on how to proceed.

The pattern detector 220 may detect a data pattern in the data. For example, the input operands 250 may be a positive zero, negative zero, positive infinity, negative infinity, or NaN value. Any one or all of these data pattern values can be special cases. If it is determined that the data pattern detected by the pattern detector 220 is a special case that the compute circuit may not handle correctly, then additional action is taken. Specifically, the pattern detector 220 can provide the data pattern and/or a control or request signal to the steering controller 230 and the configuration register 240. Configuration register 240 will, in turn, provide a corresponding value that will ensure that, for the specifically detected special case, the correct value is ultimately output from the system 200. This value is provided to the steering controller 230 which uses the value to control the compute circuit thereby providing the output results 260.

Figure 3:
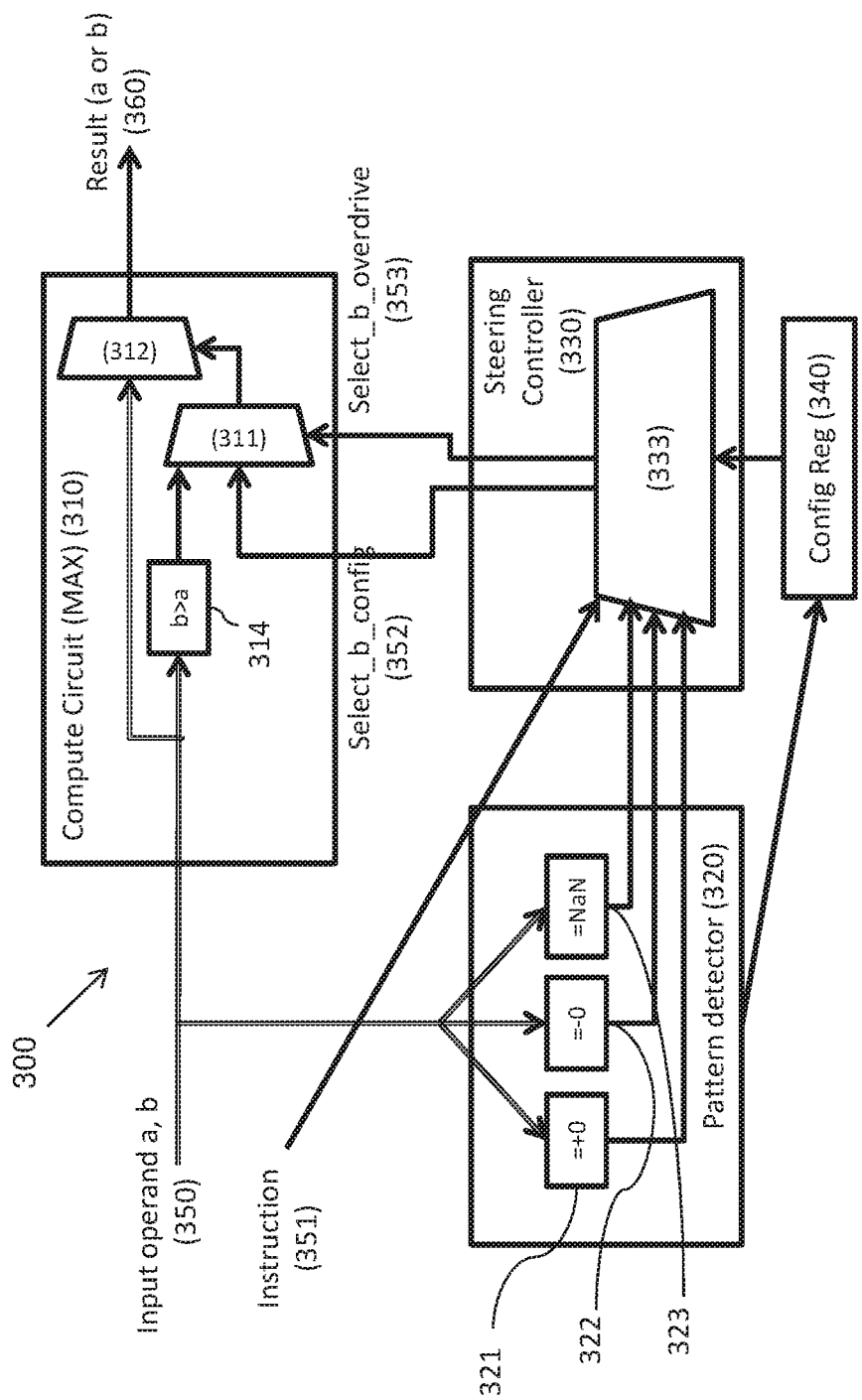
FIG. 3 is a block diagram of a system for controlling post-silicon configurable instruction behavior that includes subcomponents such as multiplexers in accordance with one or more embodiments.

FIG. 3 is a block diagram of a specific system 300 for controlling post-silicon configurable instruction behavior that includes subcomponents such as multiplexers 311, 312, and 333 in accordance with one or more embodiments. Particularly, as shown the system 300 includes a compute circuit 310, a pattern detector 320, a steering controller 330, and a configuration register 340. In this example, the compute circuit 310 is an instruction circuit that determines and outputs which of the two values is the larger using compare logic 314. However, as described above, it is possible that the way in which special condition values are handled might have changed. For example, the +0, −0, and NaN special cases may have different expected outcomes according to a different programming language or an update to an industry standard. Accordingly, if any of these are detected, the system 300 should take corrective action to make sure the result is correct. This is done as follows.

As shown, the system 300 receives input operands a and b 350. These are provided to the pattern detector 320. The pattern detector provides a signal if a special case is identified to the steering controller 330. Specifically, the pattern detector 320 provides input control values 321, 322, and 323 to the multiplexer 333. The pattern detector 320 can also provide input to the configuration register 340, which uses that input to select a corresponding corrective value that is fed to the multiplexer 333 of the steering controller 330.

Further, an instruction 351 can also be input to the steering controller 330 then can be used to select and control the compute circuit 310. The steering controller 330 can provide, using the multiplexer 333, an overdrive 353 and select 352 inputs as shown. Particularly, these inputs are provided to multiplexer 311 which feed into multiplexer 312 which output the results 360. Accordingly, in this example, the steering controller 330 controls the output when special cases are detected by bypassing the compute circuit and providing the directed result 360 directly from the configuration register 340. In other embodiments, as discussed below, the steering controller 330 can instead provide a different input or intermediate value to the compute circuit 310 for computing, or it can adjust the output value, or it can do a combination of all of these.

Figure 4:
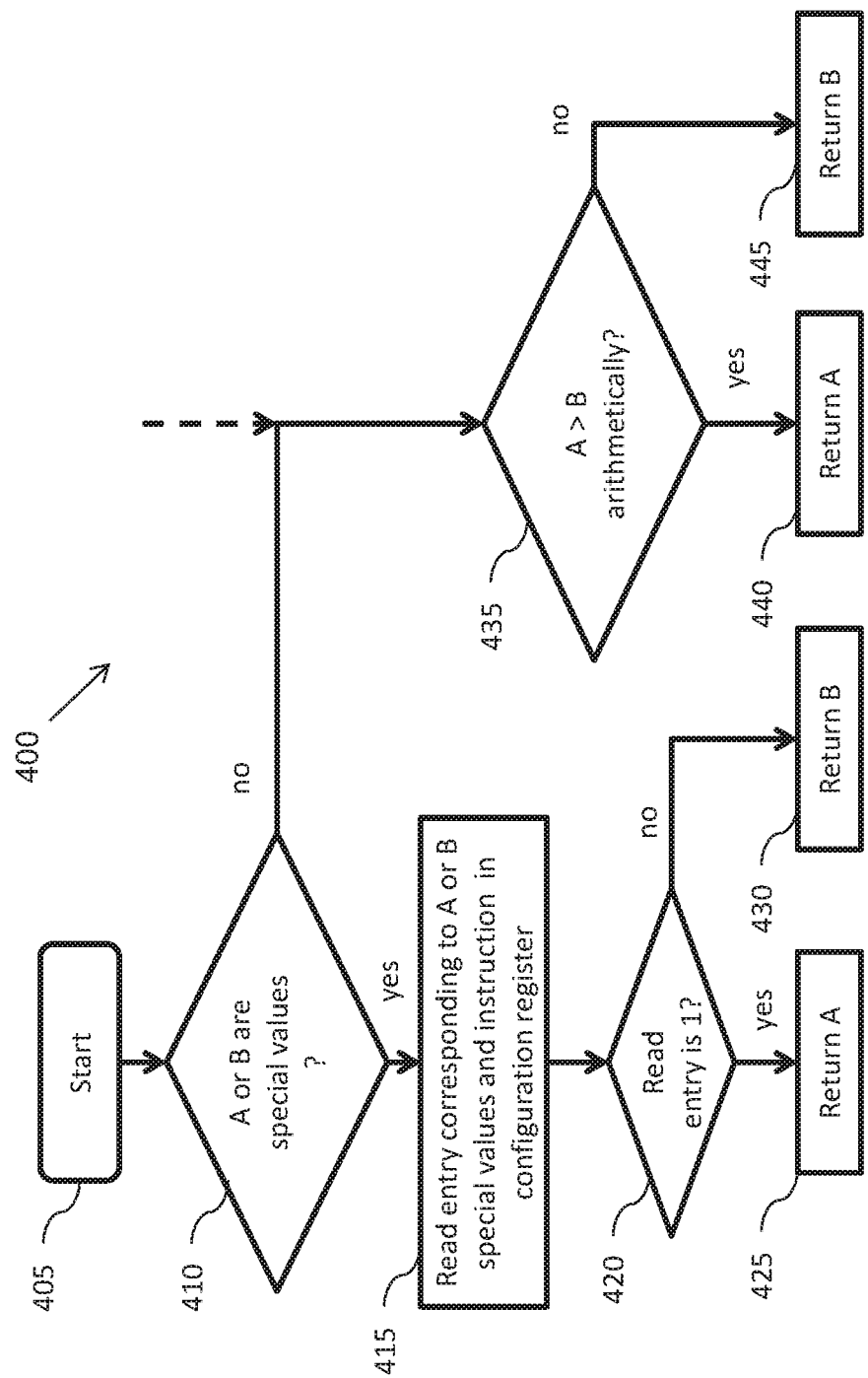
FIG. 4 is a flow chart of a method for controlling post-silicon configurable instruction behavior in accordance with one or more embodiments.

FIG. 4 is a flow chart of a method 400 for controlling post-silicon configurable instruction behavior in accordance with one or more embodiments. As shown, the method begins 405 by determining if A or B are special values (operation 410). If they are not, the method 400 operates as it would have normally done in the past without any of the corrective features. Specifically, the compute circuit will determine if A is greater than B (operation 435). If A is greater than B, then the compute circuit will return A (operation 440). If A is not larger than B, then the compute circuit will return B (operation 445).

Alternatively, if it is determined that either A or B are special values then the method reads the entry corresponding to A and/or B (whichever is the special value) and associated instructions in the configuration register (operation 415). In this example, the method 400 then determines if the entry that is read is a value of one (operation 420). If is the entry is a value of one, the method 400 returns A (operation 425). If it is not, the method 400 returns B (operation 430).

Figure 5:
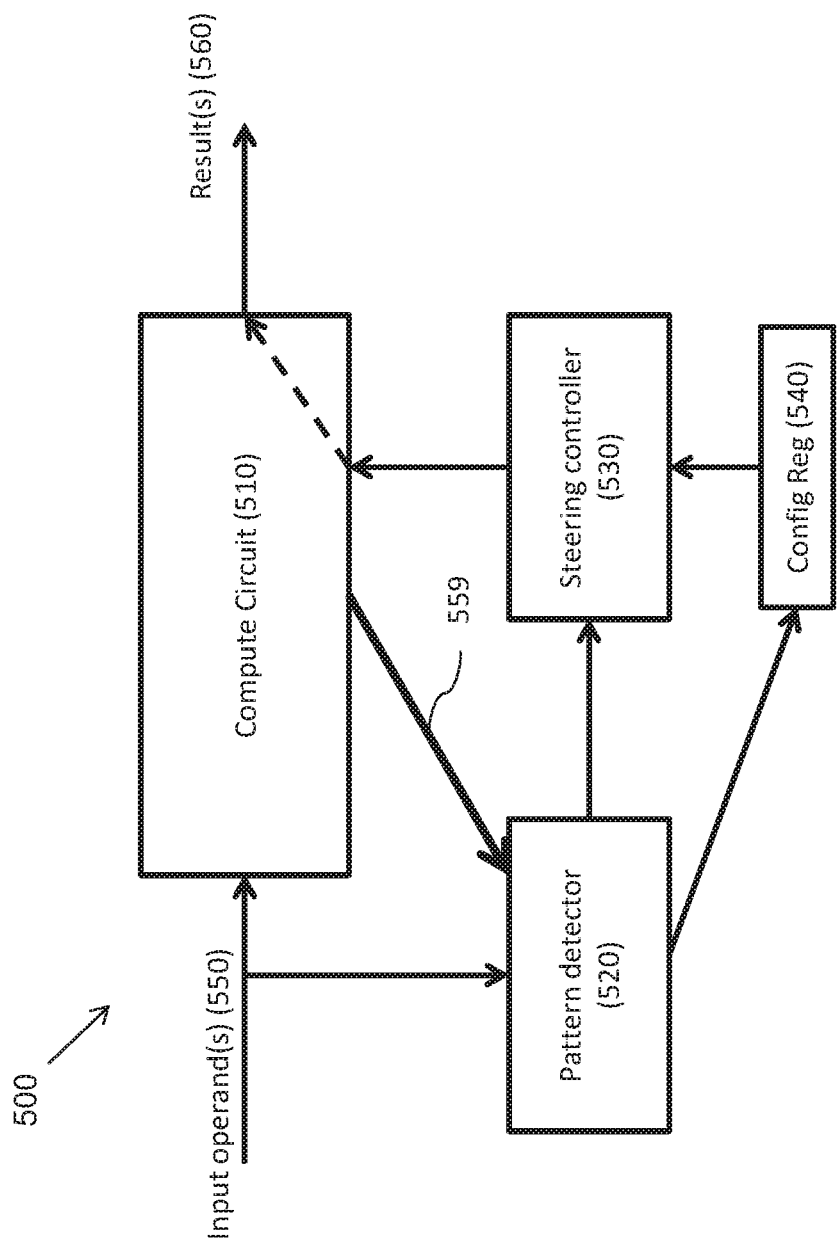
FIG. 5 is a block diagram of a system for controlling post-silicon configurable instruction behavior using an intermediate value in accordance with one or more embodiments.

Turning now to FIG. 5, a block diagram is shown of a system 500 for controlling post-silicon configurable instruction behavior using an intermediate value in accordance with one or more embodiments. The system includes a compute circuit 510, a pattern detector 520, a steering controller 530, a configuration register 540, input operands 550 and results 560. Additionally, the compute circuit 510 provides an intermediate value 559 to the pattern detector 520. Thus, in addition to, or in the alternative, the pattern detector 520 can check this intermediate value 559 to see if it corresponds to a special case. If it does, then the pattern detector 520 will notify the configuration register 540 and the steering controller 530 which will control the compute circuit 510 to output a corrected result 560. If the pattern detector 520 does not detect a special case in the received intermediate value 559, then the compute circuit 510 can be allowed to operate as it normally would processing and outputting a result 560. In this case, the compute circuit instruction can still be used for all cases and correct for those that have changed that would have otherwise rendered the compute circuit 510 unusable.

Figure 6:
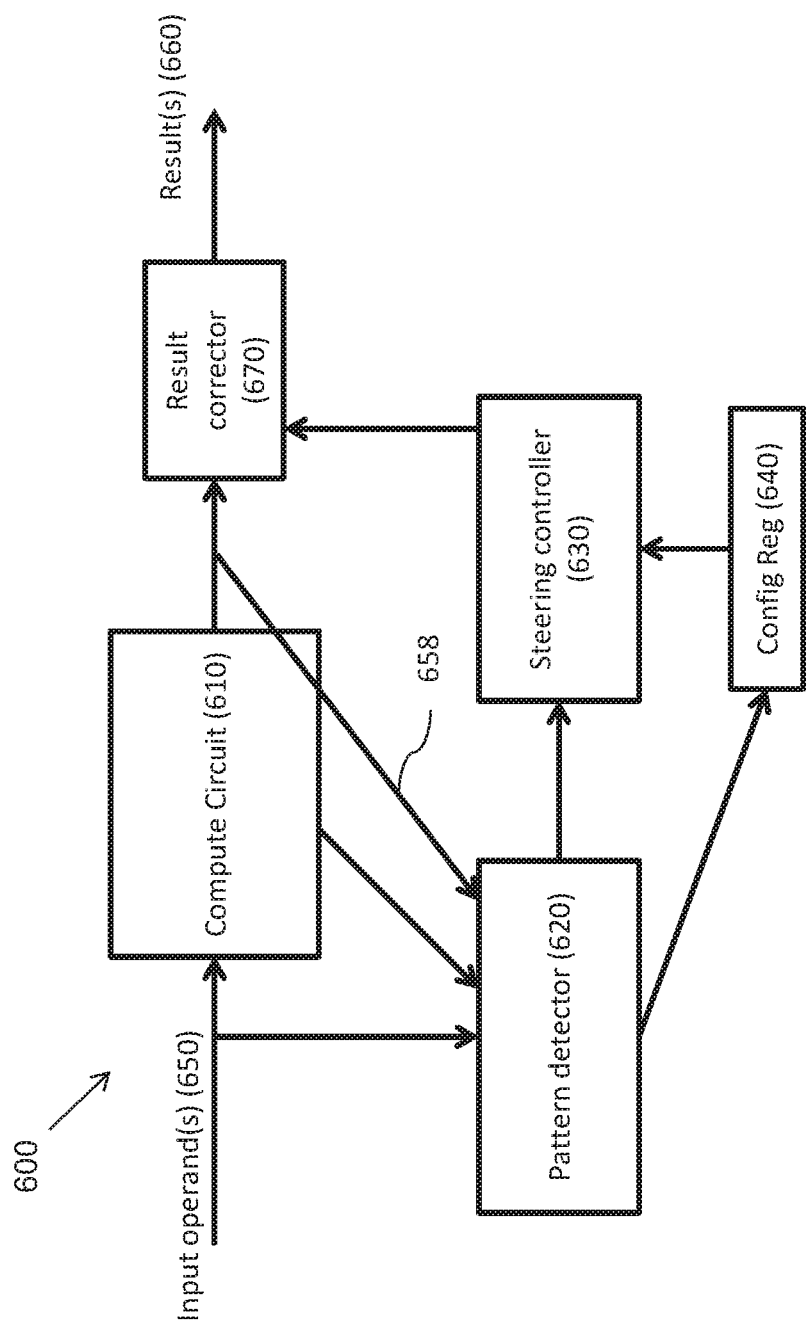
FIG. 6 is a block diagram of a system for controlling post-silicon configurable instruction behavior using a result corrector in accordance with one or more embodiments.

FIG. 6 is a block diagram of a system 600 for controlling post-silicon configurable instruction behavior using a result corrector 670 in accordance with one or more embodiments. The system 600 includes input operands 650, results 660, a compute circuit 610, a pattern detector 620, a steering controller 630, a configuration register 640, and the result corrector 670. Thus, in addition to being able to function as described above with regard to FIG. 5, this system 600 can also provide an additional point at which it can test for special cases and take corrective action. Particularly, the pattern detector 620 now also receives the output 658 from the compute circuit 610. The pattern detector 620 can take this opportunity to determine if the output of the computer circuit 610 corresponds to one of the special cases. If it does, the pattern detector 620 will notify the steering controller 630 and configuration register 640, which will provide the corresponding value from the configuration register 640 to the result corrector 670. The result corrector 670 will, in turn, use the value received from the configuration register 640 via the steering controller 630 to adjust the results 660.

Figure 7:
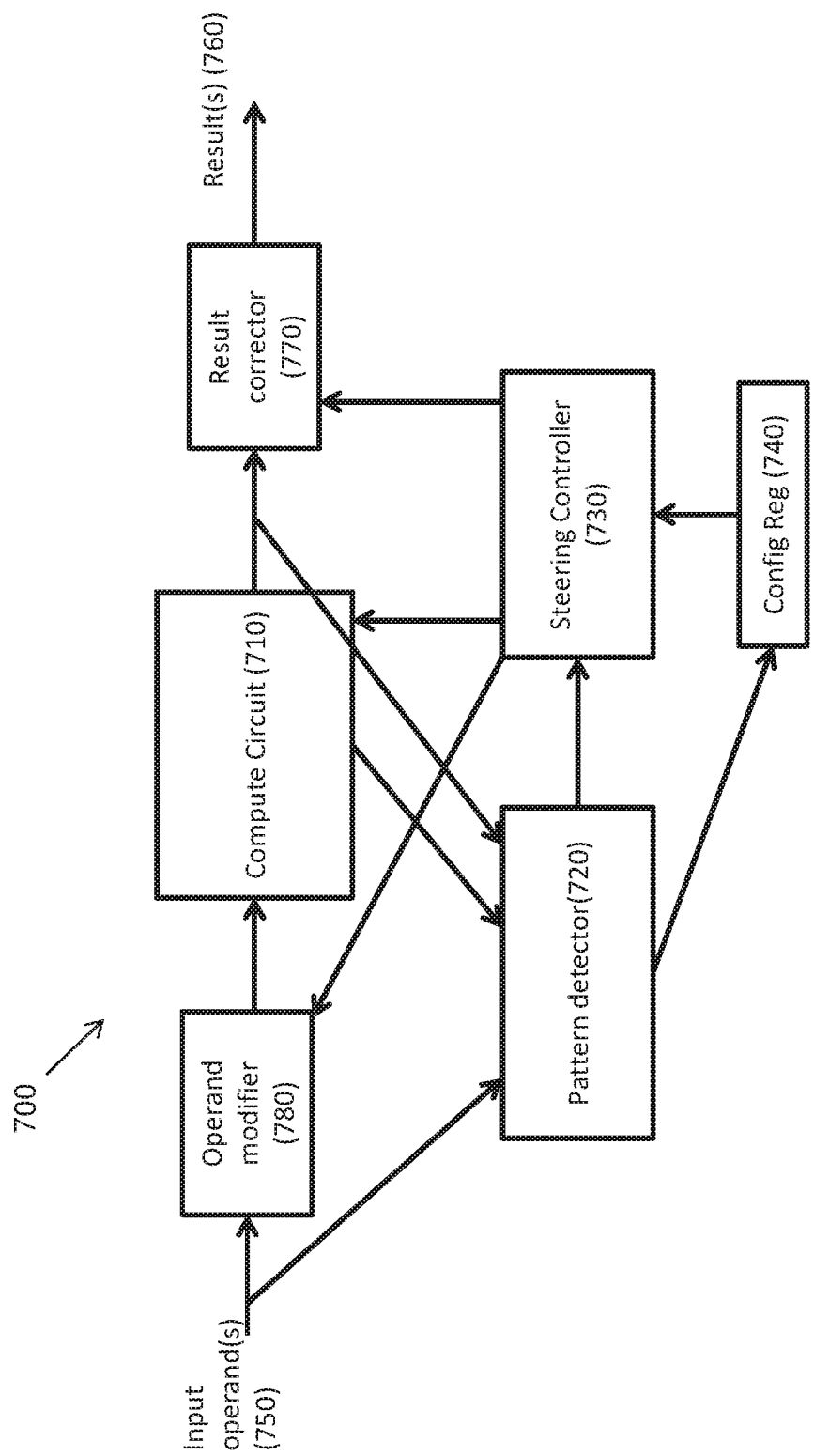
FIG. 7 is a block diagram of a system for controlling post-silicon configurable instruction behavior using an operand modifier and a result corrector in accordance with one or more embodiments.

FIG. 7 is a block diagram of a system 700 for controlling post-silicon configurable instruction behavior using an operand modifier 780 and a result corrector 770 in accordance with one or more embodiments. The system 700 includes input operands 750, a compute circuit 710, pattern detector 720, steering controller 730, configuration register 740, result corrector 770, and output results 760. As shown, the system 700 in now capable of adjusting the input operands using the operand modifier 780 before they are provided to the compute circuit 710. This is possible because the pattern detector 720 receives the input operands 750 and can detect a special case and instruct/inform the configuration register 740 and steering controller 730. The steering controller 730 can then take the provided value from the configuration register 740 that is associated with the detected special case and control the operand modifier 780 to adjust the input operands to values that, when passed through the compute circuit 710, should output correct values for the special case.

Further, similar to the functionality discussed regarding FIG. 6, the system 700 can also check for an intermediate value and adjust and can also check the output of the compute circuit 710 and adjust again using the result corrector 770. According to one or more embodiments, the system 700 can use any one or all of these detection and adjustments points. According to one or more embodiments, different detection and adjustments points can be used to detect and adjust for different special cases that may only present at certain points as compared to others.

Figure 8:
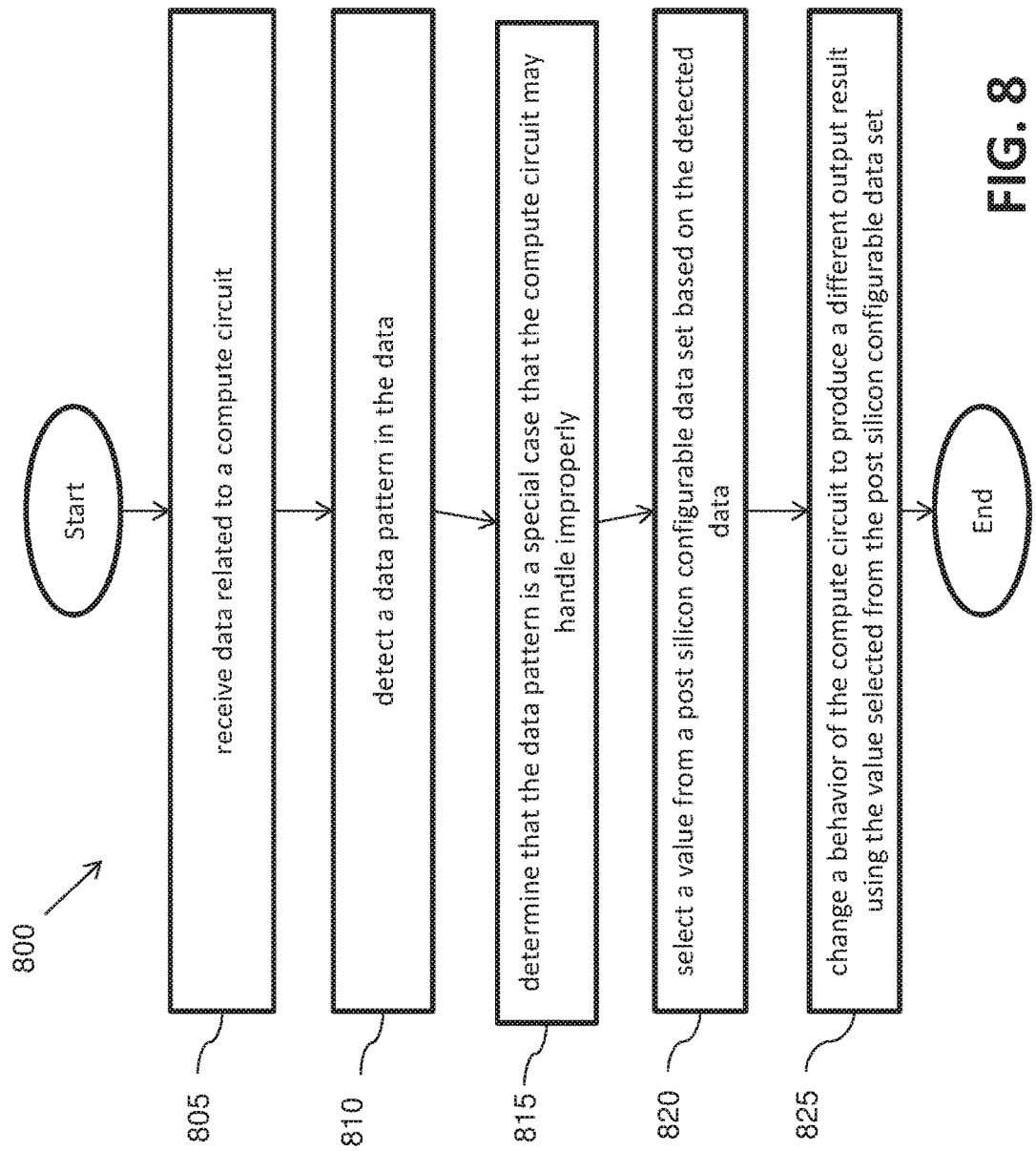
FIG. 8 is a flowchart of a method for controlling post-silicon configurable instruction behavior in accordance with one or more embodiments.

FIG. 8 is a flowchart of a method 800 for controlling post-silicon configurable instruction behavior in accordance with one or more embodiments. The method 800 includes receiving data related to a compute circuit (operation 805). The method 800 further includes detecting a data pattern in the data (operation 810). The method 800 also includes determining that the data pattern is a special case that the compute circuit may handle improperly (operation 815). Further, the method 800 includes selecting a value from a post-silicon configurable data set based on the detected data (operation 820). The method also includes changing a behavior of the compute circuit to produce a different output result based on the value selected from the post-silicon configurable data set (operation 825).

According to one or more embodiments, the data includes one or more of input operands, integers, characters, character strings, and integer strings. According to one or more embodiments, the data is input data received by the compute circuit. According to one or more embodiments, the data is produced by the compute circuit as an intermediary value. According to one or more embodiments, the data is produced by the compute circuit as an output result.

According to one or more embodiments, the compute circuit is at least one selected from a group consisting of an instruction circuit, an adder, a subtractor, a multiplier, a divider, a logic gate, an arithmetic logic unit (ALU), a floating-point unit (FPU), a central processing unit (CPU), and a graphics processing unit (GPU).

According to one or more embodiments, the data pattern is one or more of a positive zero value, a negative zero value, a NaN value, negative infinity, and positive infinity. According to one or more embodiments, the special case is defined as a processing change that has occurred since the creation of the compute circuit. According to one or more embodiments, the special case is one or more of detection of a zero value, detection of a NaN value, detection of defined integer value, or detection of a particular character.

According to one or more embodiments, the post-silicon configurable data set is stored in a configuration register. According to one or more embodiments, the post-silicon configurable data set is stored in one or more memory devices.

According to one or more embodiments, the value is one or more selected from a group consisting of an operand, an integer, a character, a character string, and an integer string. According to one or more embodiments, the value is configured to provide a correct output result in accordance with an up to date processing scheme in operation. According to one or more embodiments, the value corresponds to the detected data pattern, and wherein the value is the expected result when the detected data pattern is present.

According to one or more embodiments, changing the behavior of the compute circuit includes at least one from a group consisting of bypassing the compute circuit, using a sub-portion of internal logic of the compute circuit, providing different inputs to the compute circuit, and changing the output of the compute circuit.

Advantageously, embodiments described herein provide for late changes even post-silicon without loss of performance or requiring a large silicon area for full field programmable logic.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof.

Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for controlling post-silicon configurable instruction behavior, the method comprising:
    receiving data related to a compute circuit;
    detecting a data pattern in the data, using a pattern detector;
    determining that the data pattern is a special case that the compute circuit may handle improperly, wherein the special case is one or more of a zero value, detection of a NaN value, detection of defined integer value, or detection of a particular character;
    selecting a value from a post-silicon configurable data set located in a configuration register based on the detected data; and
    changing a behavior of the compute circuit, using a steering controller, to produce a different output result based on the value selected from the post-silicon configurable data set; wherein:
        changing the behavior of the compute circuit includes at least one from a group consisting of bypassing the compute circuit, using a sub-portion of internal logic of the compute circuit, providing different inputs to the compute circuit, and changing the output of the compute circuit.

2. The method of claim 1,
    wherein the data includes one or more of input operands, integers, characters, character strings, and integer strings.

3. The method of claim 1,
    wherein the data is input data received by the compute circuit.

4. The method of claim 1,
    wherein the data is produced by the compute circuit as an intermediary value.

5. The method of claim 1,
    wherein the data is produced by the compute circuit as an output result.

6. The method of claim 1,
    wherein the compute circuit is at least one selected from a group consisting of an instruction circuit, an adder, a subtractor, a multiplier, a divider, a logic gate, an arithmetic logic unit (ALU), a floating-point unit (FPU), a central processing unit (CPU), and a graphics processing unit (GPU).

7. The method of claim 1,
    wherein the data pattern is one or more of a positive zero value, a negative zero value, a not-a-number (NaN) value, negative infinity, and positive infinity.

8. The method of claim 1,
    wherein the special case is defined as a processing change that has occurred since creation of the compute circuit.

9. The method of claim 1,
    wherein the post-silicon configurable data set is stored in one or more memory devices.

10. The method of claim 1,
    wherein the value is one or more selected from a group consisting of an operand, an integer, a character, a character string, and an integer string.

11. The method of claim 1,
wherein the value is configured to provide a correct output result in accordance with an up to date processing scheme in operation.

12. The method of claim 1,
wherein the value corresponds to the detected data pattern, and wherein the value is an expected result when the detected data pattern is present.

13. The method of claim 1,
wherein changing the behavior of the compute circuit includes at least one from a group consisting of bypassing the compute circuit, using a sub-portion of internal logic of the compute circuit, providing different inputs to the compute circuit, and changing the output of the compute circuit.

14. A system for controlling post-silicon configurable instruction behavior, the system comprising:
a processor that comprises a compute circuit, a pattern detector, and a steering controller, wherein the processor is configured to perform a method comprising:
receiving, at the pattern detector, data related to the compute circuit;
detecting, using the pattern detector, a data pattern in the data;
determining, using at least one of a steering controller and a pattern detector, that the data pattern is a special case that the compute circuit may handle improperly, wherein the special case is one or more of a zero value, detection of a NaN value, detection of defined integer value, or detection of a particular character;
selecting, from a configuration register, a value from a post-silicon configurable data set, wherein selection is based on the detected data; and
changing, using the steering controller, a behavior of the compute circuit to produce a different output result based on the value selected from the post-silicon configurable data set; wherein:
changing the behavior of the compute circuit includes at least one from a group consisting of bypassing the compute circuit, using a sub-portion of internal logic of the compute circuit, providing different inputs to the compute circuit, and changing the output of the compute circuit.

15. The system of claim 14, wherein changing the behavior of the compute circuit further comprises:
an operand modifier that is configured to change a data input to the compute circuit by changing an input operand of the data based on the data pattern and value selected, wherein the operand modifier is controlled by the steering controller.

16. The system of claim 14, wherein changing the behavior of the compute circuit further comprises:
a result corrector that is configured to change the output result from the compute circuit based on the data pattern and value selected, wherein the result corrector is controlled by the steering controller.

17. The system of claim 14,
wherein the steering controller comprises a multiplexer that selects the value from the configuration register based on inputs from the pattern detector, and
wherein the compute circuit comprises a plurality of multiplexers that are configured to bypass logic circuitry in the compute circuit based on the value received from the multiplexer of the steering controller.

* * * * *